Dec. 14, 1965  P. H. PAPA  3,222,757
METHOD OF MAKING MOTOR SHELLS
Filed Jan. 11, 1962  2 Sheets-Sheet 1

INVENTOR.
Paul H. Papa
BY
ATTYS.

Dec. 14, 1965 P. H. PAPA 3,222,757
METHOD OF MAKING MOTOR SHELLS
Filed Jan. 11, 1962 2 Sheets-Sheet 2
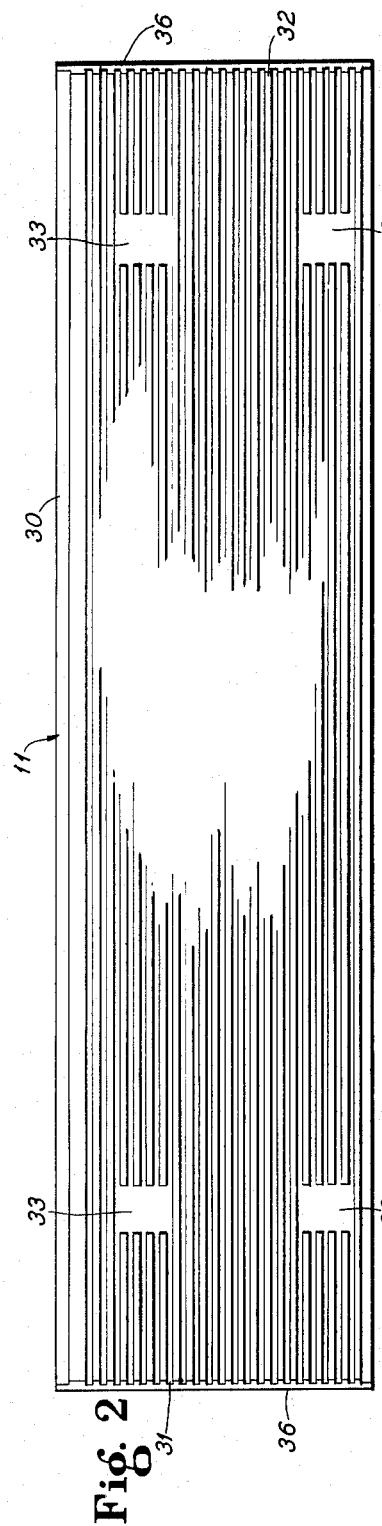
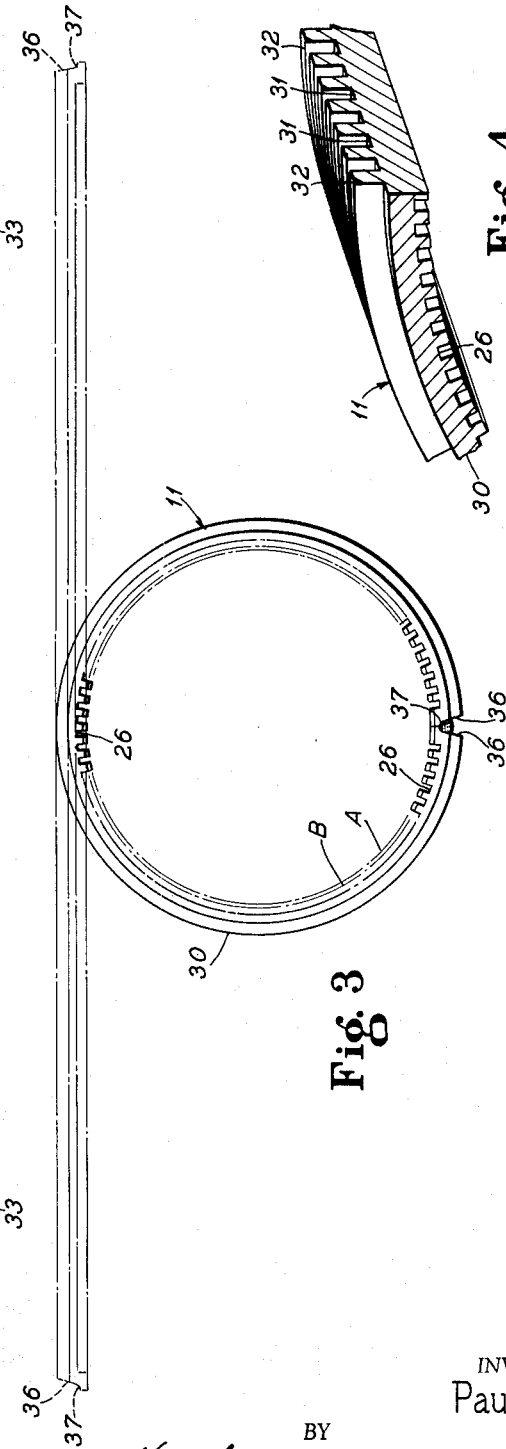
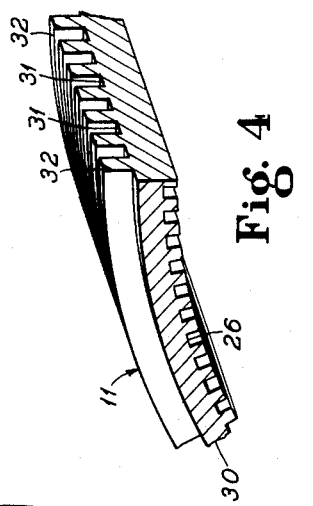
INVENTOR.
Paul H. Papa
BY
ATTYS.

United States Patent Office 3,222,757
Patented Dec. 14, 1965

3,222,757
METHOD OF MAKING MOTOR SHELLS
Paul H. Papa, Chicago, Ill., assignor to Goodman Manufacturing Company, Chicago, Ill., a corporation of Illinois
Filed Jan. 11, 1962, Ser. No. 165,546
5 Claims. (Cl. 29—155.5)

This invention relates to improvements in motors and methods of making motor shells therefor.

A principal object of the invention is to provide a simple and economical motor shell and method of making the shell, particularly adapted for quantity production methods.

Another object of the invention is to provide an improved form of motor shell and method of making the shell from a flat plate, machined to form the required cooling fins prior to forming the shell into its cylindrical form and then formed to a cylindrical shell-like form.

A further object of the invention is to provide an improved method of making motor shells from flat plates, machined while flat to provide the required cooling fins and air circulating passageways on opposite sides of the plate, and then formed to a cylindrical form of the diameter of the completed shell.

These and other objects of the invention will appear from time to time as the following specification proceeds and with reference to the accompanying drawings wherein:

FIGURE 2 is a plan view of a flat plate machined to form the motor shell;

FIGURE 3 is an end view of the formed motor shell; and

FIGURE 4 is a fragmentary perspective view of a sector of the motor shell, with one end of the sector shown in transverse section, and the side of the sector shown in longitudinal section.

Figure 1:
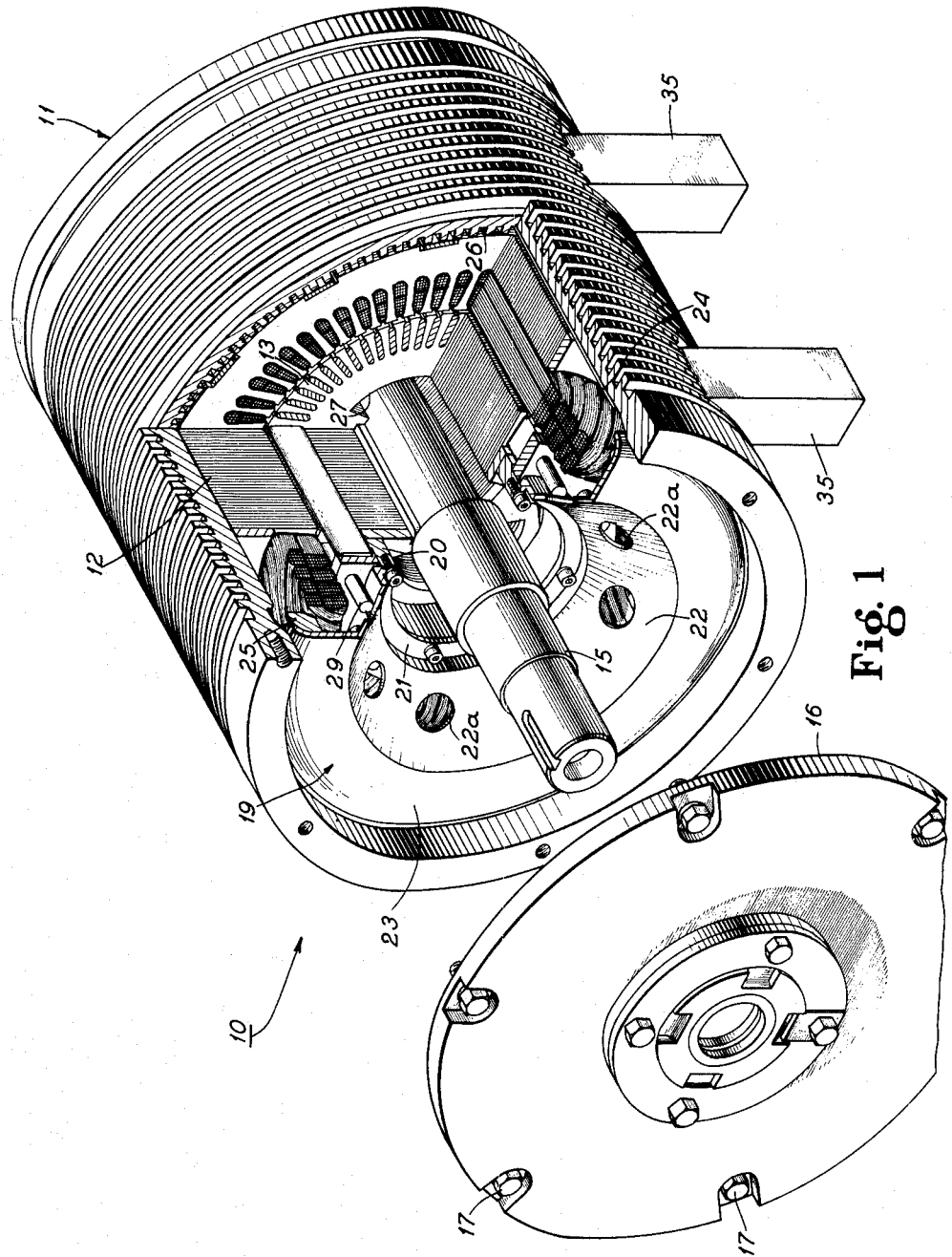
FIGURE 1 is an exploded perspective view of a motor constructed in accordance with the invention, with certain parts of the motor shell and stator and rotor of the motor broken away and shown in section.

In FIGURE 1 of the drawings, I have shown motor 10 having a generally cylindrical shell 11, a wound stator 12 within said shell and a rotor 13 rotatably mounted within said setator and carried on a motor shaft 15.

The motor shaft 15 is journalled at one end in an end plate 16, abutting the end of the shell 11, and secured thereto as by cap screws 17. The opposite end of the motor shaft 15 is journalled in a similar end plate (not shown) abutting and secured to the opposite end of the motor shell 11.

The rotor 13 and stator 12 may be conventional forms of rotors and stators, the stator being retained to the inner side of the shell 11 by the fit between said stator and the inner periphery of said shell.

The rotor 13 is shown as having an air circulating fan 19 secured to one end thereof for rotation with respect thereto. The air circulating fan 19 is generally annular and is secured to a ring 20 abutting an inner marginal portion 21 of said fan. The fan 19 has a generally outwardly flared frusto-conical portion 22 extending from the ring 21 and having apertured portions 22a opening to the stator 12, along which air is drawn to be circulated along the stator 12. A disk 23 extends radially of the outer marginal portion of the frusto-conical portion 22, along the outsides of coils 24, forming the windings of the stator. The outer marginal portion of the disk 19 is inwardly curved and has a plurality of axially inwardly extending radial fan blades 25 extending inwardly therefrom, effecting the circulation of air along slots 26 extending along the inside of the motor shell, parallel to the axis of the shaft 15, and drawing the air back along the shaft 15 through slots 27 formed in the rotor 13, and in through the openings 22a to be recirculated along the slots 26.

The rotor likewise has a plurality of circumferentially spaced pins 29 extending axially of opposite ends thereof and cooperating with the fan 19 to dissipate heat.

The motor shell 11 is formed from a flat plate 30, which may be a hot rolled steel plate. As shown in FIGURE 2, the plate is cut to size of substantially the width of the motor shell and is cut to a length of substantially the circumferential length of the motor shell. The top surface of the plate 30 may then be milled longitudinally to mill a plurality of parallel spaced grooves 31 therein, leaving ribs 32 between said grooves forming the cooling fins of the motor shell. In the operation of machining the plate 30, a number of plates 30 may be placed on a milling machine table to accommodate the milling of more than one plate with one setting of the machine.

Where the motor shell is to be provided with legs, portions of the ribs or fins 32 may be milled to the plane of the bottoms of the grooves to provide flat recessed portions 33 in the top surface of the plate, at the places where legs 35 for the motor shell will be placed, when the plate is formed to its cylindrical form.

After the grooves 31 have been formed along the plate 30, and the recesses 33 for the legs 35 are milled in the flat plate, where the motor shell is to have legs, the opposite end portions of the plate may be beveled, as indicated by reference character 36. The beveled end portions 36 of the plate 30 are inclined inwardly from the bottom towards the top of the plate and may have partially rounded lower end portions 37, which with the beveled portions of said plate form welding grooves when the plate is rolled to form and opposite ends of the plate are brought into abutting engagement with each other.

After the operation of milling the grooves 31 in the top side of the plate 30 and beveling opposite end portions thereof, the plate 30 may be inverted and again placed on a milling machine or a like tool, at right angles to its first position. The air circulating grooves 26 extending perpendicular to the cooling fins 32 may then be machined in the plate by milling or a like operation for substantially the width thereof.

The plate 30 may then be formed to a cylindrical form about a mandrel, preferably by a rolling operation until the opposite ends of the plate come into abutting engagement with each other.

The abutting ends of the plate may then be welded together, by welding along the welding groove formed by the adjacent beveled end portions 36 of the plate, to form a continuous cylindrical plate.

When the plate is formed to its cylindrical form, as shown in FIGURE 3, it may be placed in a lathe or similar machine tool, and its inner peripheral portion may be turned down from line A to line B to true the inner periphery of the shell to the form of the outer periphery of the stator 12.

It may be seen from the foregoing that an improved motor shell and method of making the shell has been provided, which is particularly adapted to be made on a large scale production basis and that all machining is on flat surfaces prior to the formation of the plate into a cylindrical shell, and the machine operations except the final trueing operation, when the shell is in its cylindrical form may be milling or similar operations, rather than a series of internal and external turning operations on a lathe, and milling operations on a milling machine.

It should here be understood that the order of machining the transverse and longitudinal grooves may be reversed and that the ends of the top side of the plate may be formed either prior to or after machining of the longitudinal grooves 31.

While I have herein shown and described one form in which my invention may be embodied, it may readily be understood that various variations and modifications in the invention may be attained without departing from the spirit and scope of the novel concepts thereof, as defined by the claims appended hereto.

I claim as my invention:

1. The method of making motor shells having circumferentially extending cooling fins and internal air circulating passageways extending perpendicular to said cooling fins, which comprises the steps of
   (a) forming a series of parallel spaced grooves along one side of an elongated flat metal plate for substantially the length thereof,
   (b) forming a series of parallel spaced grooves along the opposite side of the plate perpendicular to the first mentioned grooves,
   (c) forming the plate to the form of a true cylinder,
   (d) securing the adjacent ends of the plate together to form a generally cylindrical shell and
   (e) trueing the inner periphery of the cylindrical shell by a machining operation.

2. The method of making motor shells having circumferentially extending cooling fins and internal air circulaing passageways extending perpendicularly to the cooling fins, which comprises the steps of
   (a) beveling opposite ends of a flat plate of the circumferential length of the completed motor shell and of substantially the width of the shell,
   (b) forming a series of parallel spaced grooves along the side of the plate having the beveled ends,
   (c) inverting the plate and forming a series of parallel spaced grooves in the opposite side of the plate extending perpendicularly to the first mentioned grooves,
   (d) then forming the plate to the form of a true cylinder with the longitudinally extending grooves on the outside thereof and the beveled end portions facing each other, and forming a welding groove,
   (e) and then welding the adjacent ends of the cylindrically formed plate together by welding along the welding groove.

3. The method of making motor shells having circumferential external cooling fins and internal air circulating passageways extending perpendicularly to the cooling fins, which comprises the steps of
   (a) cutting a flat steel plate to the circumferential length of the completed shell,
   (b) forming external fins for the completed shell by machining a series of parallel spaced grooves along one side of the plate, for substantially the length thereof,
   (c) inverting the plate and forming air circulating passageways for the shell when completed by machining a series of parallel spaced grooves on the opposite side from the spaced longitudinally extending grooves and perpendicular to the longitudinally extending grooves,
   (d) then forming the plate to a cylindrical form with opposite ends of the plate into abutting engagement with each other and securing the adjacent ends of the plate together.

4. A method of making motor shells which comprises the steps of
   (a) cutting a flat steel plate to substantially the width of the completed shell and to the circumferential length of the completed shell,
   (b) beveling opposite ends of the plate for the width thereof,
   (c) forming parallel spaced cooling fins for the completed shell by machining a plurality of parallel spaced grooves along one side of the plate for substantially the length thereof,
   (d) inverting the plate and forming air circulating passageways for the shell when completed by machining a series of parallel spaced grooves on the opposite side of the plate from the cooling fins and transversely of the plate, perpendicular to the fins,
   (e) then forming the plate to a cylindrical form, with the beveled end portions facing each other, to form a welding groove,
   (f) welding the adjacent ends of the cylindrically formed plate together along the welding groove,
   (g) then trueing the inner periphery of the formed cylindrical shell by machining.

5. A method of making motor shells which comprises the steps of
   (a) cutting a flat steel plate to substantially the width of the completed shell and to the circumferential length of the completed shell,
   (b) beveling opposite ends of the plate for the width thereof,
   (c) forming parallel spaced cooling fins for the completed shell by milling a plurality of parallel spaced grooves along one side of the plate for substantially the length thereof,
   (d) milling recesses in the plate at the locations for the supporting legs for the shell when completed, for substantially the depth of the parallel spaced grooves,
   (e) inverting the plate and forming air circulating passageways for the shell when completed, by milling a plurality of parallel spaced grooves along the opposite side of the plate from the cooling fins, perpendicular to the cooling fins,
   (f) rolling the plate to a cylindrical form, with the beveled end portions facing each other, to form a welding groove,
   (g) then welding the adjacent ends of the cylindrically formed plate together along the welding groove.

References Cited by the Examiner

UNITED STATES PATENTS

| | | | |
|---|---|---|---|
| 1,380,943 | 6/1921 | Baum | 310—57 |
| 2,285,233 | 6/1942 | Smith | 29—155.53 |
| 2,401,235 | 5/1946 | Farr et al. | 29—157.3 |
| 2,470,408 | 5/1949 | Nader. | |
| 2,483,024 | 9/1949 | Roters | 29—155.53 |
| 2,804,559 | 8/1957 | Brewer | 310—254 |
| 2,810,847 | 10/1957 | Tweedy | 310—254 |
| 2,856,162 | 10/1958 | Adams | 29—157.3 |

FOREIGN PATENTS

| | | |
|---|---|---|
| 595,148 | 3/1960 | Canada. |
| 612,076 | 10/1926 | France. |

WHITMORE A. WILTZ, *Primary Examiner.*

JOHN F. CAMPBELL, *Examiner.*